United States Patent Office 3,535,608
Patented Oct. 20, 1970

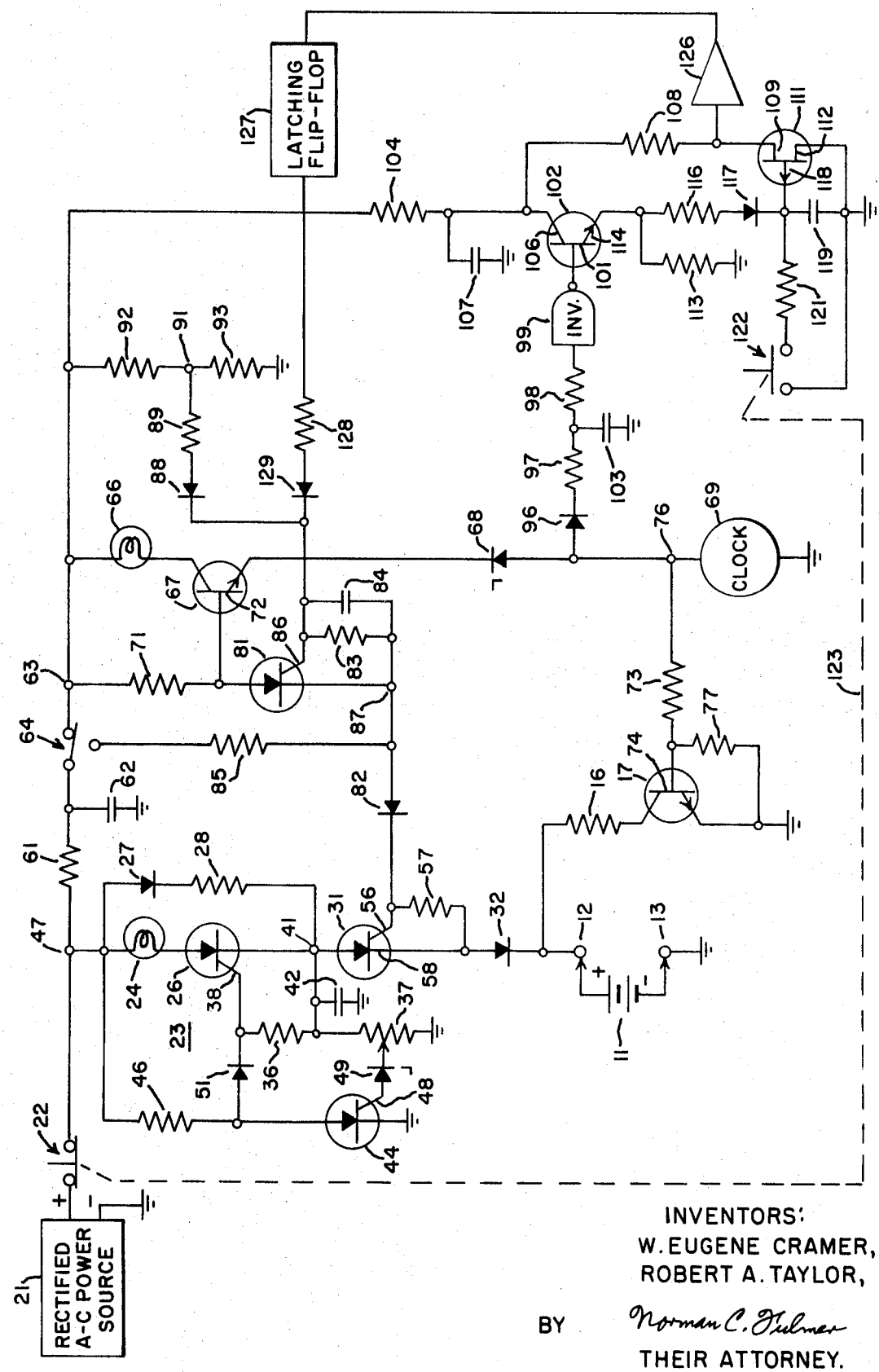

3,535,608
BATTERY MAINTENANCE CIRCUIT FOR USE WITH UNRELIABLE CHARGING SOURCES
Wilford Eugene Cramer and Robert A. Taylor, Syracuse, N.Y., assignors to General Electric Company, a corporation of New York
Filed Dec. 29, 1967, Ser. No. 694,562
Int. Cl. H02j 7/00
U.S. Cl. 320—14                                    7 Claims

ABSTRACT OF THE DISCLOSURE

A maintenance circuit is disclosed, for rechargeable batteries such as the nickel-cadmium type. The circuit tests the battery capability by discharging it through a simulated load, and measures the time of operation until the battery voltage drops to an inoperative level. If this measured time exceeds a certain value, it is known the battery is capable of satisfactory performance. After the capability test, the circuit automatically charges the battery with a full charge followed by a trickle charge, whereupon it is maintained ready for use. The circuit includes a memory arrangement which functions, in the event of a temporary power failure, to insure that the circuit will resume the same function, i.e. charging or discharging, as was occurring at the time of power failure.

BACKGROUND OF THE INVENTION

Various arrangements are known for testing and for charging batteries. For certain battery uses, for example military, space exploration, and emergency applications, it is important to have a circuit for testing and indicating the battery capability, and also for charging the battery. It is desirable that this testing and charging be performed automatically. However, when the charging current source is unreliable due to temporary power interruptions such as are likely to occur under battle conditions or with emergency power sources, an automatic circuit would be likely to give a false indication of the battery capability, and also may undesirably change from the charging mode to the discharging mode, or vice versa, when power is restored.

SUMMARY OF THE INVENTION

Objects of the invention are to provide an improved battery maintenance circuit for testing and charging batteries, and to overcome the problems described above.

The battery maintenance circuit of the invention comprises, briefly and in a preferred embodiment, circuit means for connecting a simulated load across the battery, timer means for measuring and indicating the time required for the battery voltage to drop to a predetermined level, means for disconnecting the simulated load and timer means during any power failure, means responsive to the battery voltage reaching said predetermined level and adapted to disconnect the simulated load and cause the battery to charge from a source of charging current, memory means adapted to retain an indication of whether the circuit is in the charge or discharge mode, and means responsive to said memory means for insuring that the circuit will resume the charge or discharge mode of operation following a temporary power failure.

BRIEF DESCRIPTION OF THE DRAWING

The single figure of the drawing is an electrical schematic diagram of a preferred embodiment of the invention.

DETAILED DESCRIPTION OF THE DRAWING

A battery 11 which is to be tested and charged, is connected to the terminals 12 and 13. Terminal 13 is connected to electrical ground. A simulated electrical load 16 for the battery is connected between the terminal 12 and electrical ground via the collector-emitter path of a transistor 17 which is rendered alternatively conductive or nonconductive by means of circuitry to be described. The simulated load 16 may comprise a resistor, and/or one or more series combinations of diodes and resistors, if a nonlinear simulated load is desired.

A rectified alternating current power source 21 has a negative terminal connected to electrical ground, and a positive terminal connected to the battery test terminal 12 via a normally closed pushbutton switch 22, a charging current regulator 23 comprising an indicator lamp 24 and a silicon controlled switch (SCS) 26 connected in series across a series connected diode 27 and resistor 28, an SCS 31, and a diode 32. A resistor 36 and potentiometer 37 are connected in series between electrical ground and the control electrode 38 of the SCS 26. The junction of resistor 36 and potentiometer 37 is connected to the junction 41 of the SCS 26 and SCS 31, and a capacitor 42 is connected between this point and electrical ground. An SCS 44 and a resistor 46 are connected between electrical ground and the point 47 of rectified alternating current, and the control electrode 48 of the SCS 44 is connected to an adjustable tap on the potentiometer 37, via a Zener diode 49. A diode 51 is connected between the control electrode 38 of SCS 26, and the junction of the SCS 44 and resistor 46.

The above-described charging current regulator circuit 23 functions as follows. When the battery 11 is to be charged, the SCS is turned to the "on" or conductive condition by means of current applied to its control electrode 56 from circuitry to be described later. A bias resistor 57, is connected between the control electrode 56 and cathode 58 of the SCS 31. With the SCS 31 in the "on" condition, the voltage at point 41 is relatively low if the voltage of battery 11 is relatively low due to being in a discharged condition. Since a portion of the voltage at point 41 is applied to the SCS 44 via the potentiometer 37, if this potentiometer 37 is adjusted properly, a relatively low voltage at point 41 will cause ths SCS 44 to be "off," whereupon the voltage applied to the control electrode 38 of SCS 26 causes it to be "on," whereupon the pulsating rectified voltage from the power source 21 flows through the indicator lamp 24, SCS 26, SCS 31, and diode 32, to the battery 11 thereby charging the battery. When the battery 11 becomes fully charged, its voltage will be relatively higher than before, which raises the voltage level at point 41 such that the SCS 44 becomes conductive, which in turn renders the SCS 26 nonconductive or in the "off" condition, whereby only a relatively small amount of current flows to the battery, via the diode 27, resistor 28, SCS 31, and diode 32, for supplying a "trickle" charge to the battery 11 in order to maintain it in a fully charged condition. The battery can then be removed and replaced with another battery. The indicator lamp 24 glows when the battery is being charged, and when the lamp 24 stops glowing, it indicates that the battery 11 has become fully charged and is on trickle charge. It should be noted that pulsating rectified alternating current is employed for charging the battery 11, because the silicon controlled switches can be turned off readily by applying relatively negative voltage to their control electrodes, whereas if direct current were employed for charging, means would have to be provided for interrupting the cathode-to-anode current flow in order to turn them to the off condition.

The battery charging circuitry has been described above for convenience, whereas in actual operation, the battery capability usually is first tested, prior to the above-described charging.

The circuitry for controlling the battery capability testing will now be described. Pulsating rectified alternating current from the point 47 is filtered, by means of a series-connected filter resistor 61 and a parallel-connected filter capacitor 62, so as to provide filtered direct current at the point 63. Normally closed contacts of a double throw switch 64 are interposed between the resistor 61 and the point 63. Connected between the direct current point 63 and electrical ground, in series and in the order named, are an indicator lamp 66, the collector-emitter path of a transistor 67, a Zener diode 68, and an elapsed-time counter or clock 69. A resistor 71 is connected between the current point 63 and the base electrode 72 of the transistor 67. A resistor 73 is connected between the base electrode 74 of the load control transistor 17, and the junction 76 of the clock 69 and Zener diode 68. Another resistor 77 is connected between the base 74 and electrical ground.

An SCS 81 is provided, for controlling the on and off conditions of the battery charging control SCS 31, and is connected with its anode-cathode path in series with a diode 82 between the base electrode 72 of transistor 67 and the control electrode 56 of SCS 31. A biasing resistor 83 and capacitor 84 are connected in parallel between the control electrode 86 of SCS 81 and the junction 87 of the SCS 81 and diode 82, and a resistor 85 is connected between this junction 87 and the normally open contact of the switch 64. A diode 88 and resistor 89 are connected in series between the control electrode 86 of SCS 81, and a point 91 of reference potential at the junction of a pair of resistors 92 and 93 connected in series between the direct current point 63 and electrical ground. The voltage at point 91 is such as to normally backward-bias the SCS 81 to the nonconducting condition when the battery voltage is above a minimum threshold level.

Prior to testing the battery capability, it may be desirable to manually operate the switch 64, to disable the test circuitry and activate the charging circuit by biasing the SCS 31 "on." If the indicator lamp 24 does not light or when it goes out, it is known the battery is fully charged. The switch 64 is then return to its normal position as shown. To initiate functioning of the circuit, i.e. the battery capability test followed automatically by charging of the battery, the pushbutton switch 22 is momentarily depressed, thereby removing the current source, and causing all of the SCR devices to be in the nonconducting condition. Upon releasing the switch 22, thereby connecting the rectified alternating current to the circuit, the transistor 67 is rendered conductive since its base electrodes 72 is at the positive potential established by the resistor 71, the SCS 81 being back-biased to the nonconductive condition due to the reference voltage 91. Direct current now flows from point 63, through the indicator lamp 66, transistor 67, diode 68, and the elapsed timeclock 69. This current establishes a voltage at the point 76, which renders the transistors 17 conductive, thereby connecting the simulated load 16 across the battery 11. Thus, the battery 11 discharges through the simulated load 16 at a rate determined by the characteristics of the load 16, and the clock 69, which preferably is a digital time counter, measures and indicates the length of the discharge or battery capability test; the longer this time, the better is the capability of the battery 11 to perform. The indicator lamp 66 gives a visual indication that the battery capability discharge function is occurring.

When the battery 11 has discharged to the point where its voltage level is at a predetermined minimal level for satisfactory battery performance in its intended use, the voltage at terminal 12 is sufficiently low so that current flows into the battery, from the voltage referenced point 91, via resistor 89, diode 88, the control electrode-cathode path of the SCS 81, diode 82, the control electrode-cathode path of SCS 31, and diode 32. This current flow causes the SCS devices 81 and 31 to become conductive. Upon the SCS 81 becoming conductive, it lowers the voltage on the base electrode 72 of transistor 67, thereby rendering this transistor nonconductive, thereby terminating flow in the indicator lamp 66 and in the elapsed time clock 69, whereupon the clock 69 indicates the length of time the battery 11 was able to supply the predetermined required amount of current, until its voltage dropped below a minimum acceptable level with respect to the reference voltage at point 91, through the simulated load 16. The aforesaid cessation of current through the clock 69, removes voltage from the point 76, whereupon the load control transistor 17 is rendered nonconductive, thus terminating the battery capability testing. Simultaneously with the foregoing, the charging control transistor 31, having been rendered conductive, permits charging current from the point 47 to flow to the battery, as has been described above; first at a full charge rate, with the SCS 26 rendered conductive as has been described, followed by a trickle charge to keep the battery at fully charged condition, this trickle charge flowing via the diode 27 and resistor 28 after the SCS 26 is rendered nonconductive as has been described.

As has been described, upon momentarily pushing the start button 22, the battery 11 is automatically tested as to capability, with the time duration of capable performance being indicated by the clock 69, followed automatically by charging thereof so that the battery 11 is in condition for use, whereupon the battery 11 may be removed at any time from the terminals 12 and 13 and connected to apparatus which it is to energize.

As has been described, when the battery capacity tester and charging circuit is used in certain severe environments, such as battle conditions or in emergency situations, there may be temporary interruptions of the power from the power source 21, and these interruptions might undesirably cause excessive discharge (which could damage the battery), erroneous battery capability indications on the clock 69, and also might cause the battery to charge whereas it had previously been in the capability test conditions prior to the power failure, or vice versa.

The circuitry will now be described which insures proper operation of the circuit in the event of temporary power failures. A diode 96, a pair of resistors 97 and 98, and a signal inverter 99, are connected in series between the junction 76 of the clock 69 and the Zener diode 68, and the base electrode 101 of a transistor 102. A capacitor 103 is connected between electrical ground and the junction of the resistors 97 and 98. A resistor 104 is connected between the collector 106 of transistor 102, and the point 63 of direct current. A capacitor 107 is connected between the collector 106 and electrical ground, and a resistor 108 is connected between the collector 106 and a sink electrode 109 of a field effect transistor (FET) 111, the drain electrode 112 being electrically grounded. A resistor 113 is connected between electrical ground and the emitter 114 of the transistor 102, and a resistor 116 and a diode 117 are connected in series between the emitter 114 and the gate electrode 118 of the FET 111. A low-leakage and temperature-stable capacitor 119 is connected between the gate 118 and electrical ground, and a resistor 121 and a normally "off" pushbutton switch 122 are connected in series across the capacitor 119, the normally off switch 122 being mechanically ganged to the normally-on pushbutton switch 22, as indicated by the dashed line 123.

An emitter follower amplifier 126, a latching flip-flop circuit 127, a resistor 128, and a diode 129 are connected in series, as shown, between the sink electrode 109 of FET 111, and the control gate electrode 86 of the SCS 81.

The circuit just described, commencing with the diode 96 and ending with the diode 129, constitutes a memory circuit for insuring that the charging or discharging of the battery 11 will resume following any interruption of power from the power source 21. When the pushbutton switch 22 is momentarily pressed, as described above, for initiating the battery capability discharge test, the normally open switch 122 temporarily closes, thus insuring that the capacitor 119 will be in the discharged condititon. During the battery capability discharge operation, as described above, when current is flowing through clock 69, the voltage at point 76 is such that, when inverted by the inverter 99, it will render the transistor 102 nonconductive, whereupon the memory capacitor 119 remains completely discharged during the battery capability test. Therefore, in the event of temporary power failure or interruption during the battery capability testing, when the power resumes the effect will be the same as when the pushbutton switches 22 and 122 were temporarily depressed in order to initiate operation of the circuit. Therefore, the battery capability discharge testing will continue, and the clock 69 will resume the measurement of time of battery operation into the simulated load.

When the circuit automatically changes to the battery charging mode of operation, as has been described, thus removing voltage from the point 76, the transistor 102 will become conductive, and the memory capacitor 119 will become charged from the current point 63, via the resistor 104, transistor 102, resistor 116, and diode 117. The memory capacitor 119 remains charged during the battery charging stage of operation. In the event of a power failure during the battery charging mode of operation, the capacitor 119 will retain a charge for a considerable period of time, such as up to ten hours or more, due to the very high impedance at the gate 118 of the FET 111. If the power from source 21 comes on again during this memory time period of the capacitor 119, the voltage charge retained on this capacitor, applied via the FET 111 and emitter follower amplifier 126 to the latching flip-flop 127, causes an output voltage at the flip-flop 127 which, when applied via the resistor 128 and diode 129 to the gate control electrode 86 of SCS 81, renders it immediately conductive thereby insuring that the charging mode of operation will continue following the temporary power failure.

From the foregoing description it will be realized that the invention achieves its objectives of providing a new and improved battery maintenance circuit, which tests battery capability and automatically thereafter charges the battery, and which functions properly in the event of temporary power failure.

While a preferred embodiment of the invention has been shown and described, various other embodiments and modifications will become apparent to persons skilled in the art, and will fall within the scope of invention as defined in the following claims.

What is claimed is:

1. A battery maintenance circuit comprising, in combination with a rechargeable battery:
   (a) a load;
   (b) a time-indicating device;
   (c) means operable to connect said load across said battery to test the capability thereof by passing current through the load for a time period such that the battery discharges to a predetermined remaining level of charge, said means being operable also to hold said time-indicating device activated through said time period to indicate the duration thereof and thus provide a measure of battery capability;
   (d) a charging circuit for said battery; and
   (e) control means responsive to battery voltage and operative when battery voltage drops to a level corresponding to said predetermined remaining level of charge to disconnect the battery from said load, to deactivate said time-indicating device, and to cause said charging circuit to supply charging current flow to said battery, said control means being further operative when battery voltage rises to a level corresponding to normal charge level to arrest said charging current flow to the battery.

2. A circuit as claimed in claim 1, including a transistor connected with its collector-emitter path interposed between said battery and said load, said control means including circuit means connected between said time-indicating device and the base of said transistor for rendering said transistor conductive only when said time-indicating device is operating, said charging circuit including a silicon controlled switch (SCS) connected in series with a source of charging current, means normally biasing said SCS in the nonconductive condition, and means included in said control means for rendering said SCS conductive to cause the battery to be charged from said source of charging current.

3. A circuit as claimed in claim 2, in which said time-indicating device is electrically operated from a source of current, and including a transistor having its collector-emitter path interposed in series with said time-indicating means and said source of current, and in which said control means includes a silicon controlled switch (SCS) and a reference voltage connected to the gate control electrode thereof, said last-named SCS being connected to be rendered conductive when the voltage level of said battery drops to a predetermined value with respect to said reference voltage and further being connected so that, when conductive, it renders nonconductive said transistor in series with the time-indicating means and renders conductive said SCS in series with the source of charging current.

4. A circuit as claimed in claim 2, including a memory means for retaining an indication of circuit mode of operation during a power failure and adapted to cause said circuit to resume the same capability testing or charging mode of operation as was occurring at the time of power failure.

5. A circuit as claimed in claim 4, in which said memory means includes a capacitor, means causing said capacitor to be discharged during said capability test mode of operation, means causing said capacitor to be charged during said charging mode of operation, and means responsive to the charge condition of said capacitor following a power failure to cause said circuit to resume the capability test mode of operation if said capacitor charge is substantially zero and to resume the charging mode of operation if said capacitor has a charge.

6. A circuit as claimed in claim 1, including a memory means for retaining an indication of circuit mode of operation during a power failure and adapted to cause said circuit to resume the same capability testing or charging mode of operation as was occurring at the time of power failure.

7. A circuit as claimed in claim 6, in which said memory means includes a capacitor, means causing said capacitor to be discharged during said capability test mode of operation, means causing said capacitor to be charged during said charging mode of operation, and means responsive to the charge condition of said capacitor following a power failure to cause said circuit to resume the capability test mode of operation if said capacitor charge is substantially zero and to resume the charging mode of operation if said capacitor has a charge.

References Cited

UNITED STATES PATENTS

| | | | |
|---|---|---|---|
| 3,258,670 | 6/1966 | Piechon | 320—6 |
| 3,355,651 | 11/1967 | Olson | 320—31 |
| 3,356,922 | 12/1967 | Johnston | 320—6 |
| 3,409,815 | 11/1968 | Wright et al. | 320—37 X |
| 3,431,481 | 3/1969 | Smyth | 320—48 |

J D MILLER, Primary Examiner

J. M. GUNTHER, Assistant Examiner

U.S. Cl. X.R.

320—6, 8, 31, 40, 48